July 19, 1927.
A. A. TOWERS
1,636,394
DISAPPEARING WINDOW FOR VEHICLES
Filed June 23, 1925  2 Sheets-Sheet 1
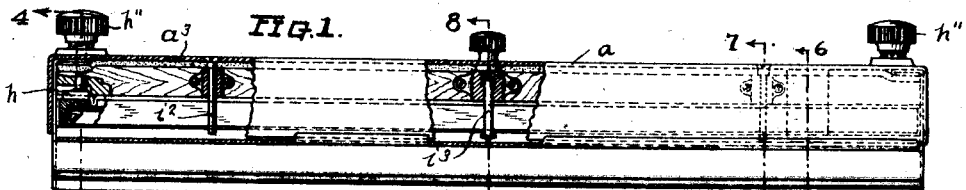
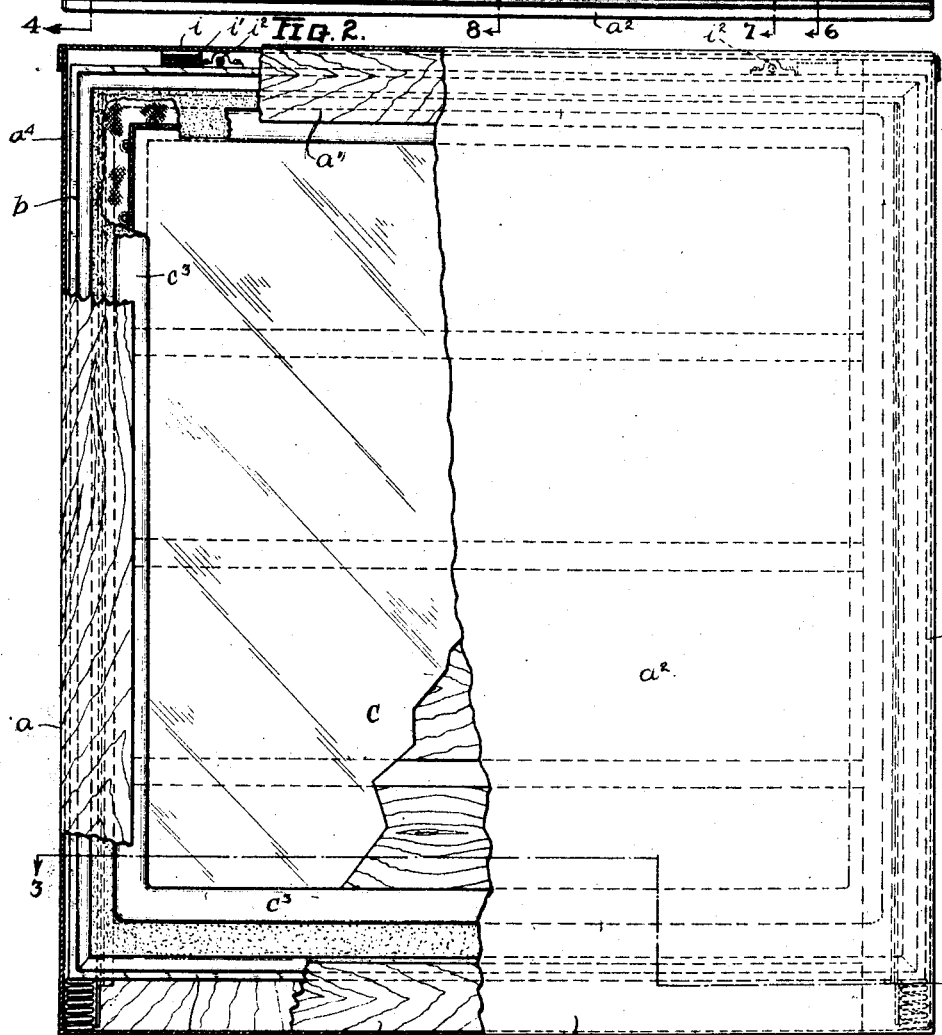
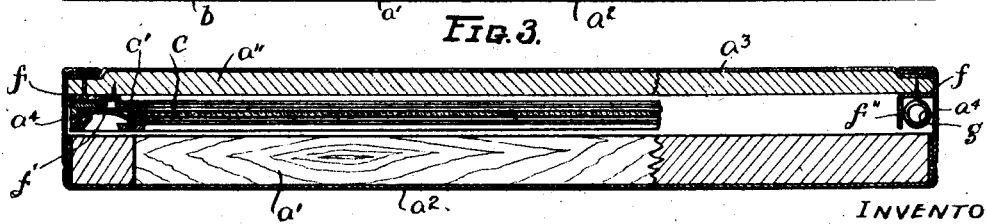
INVENTOR
ARTHUR A TOWERS.
By
ATTORNEY.

July 19, 1927.
A. A. TOWERS
1,636,394
DISAPPEARING WINDOW FOR VEHICLES
Filed June 23, 1925   2 Sheets-Sheet 2
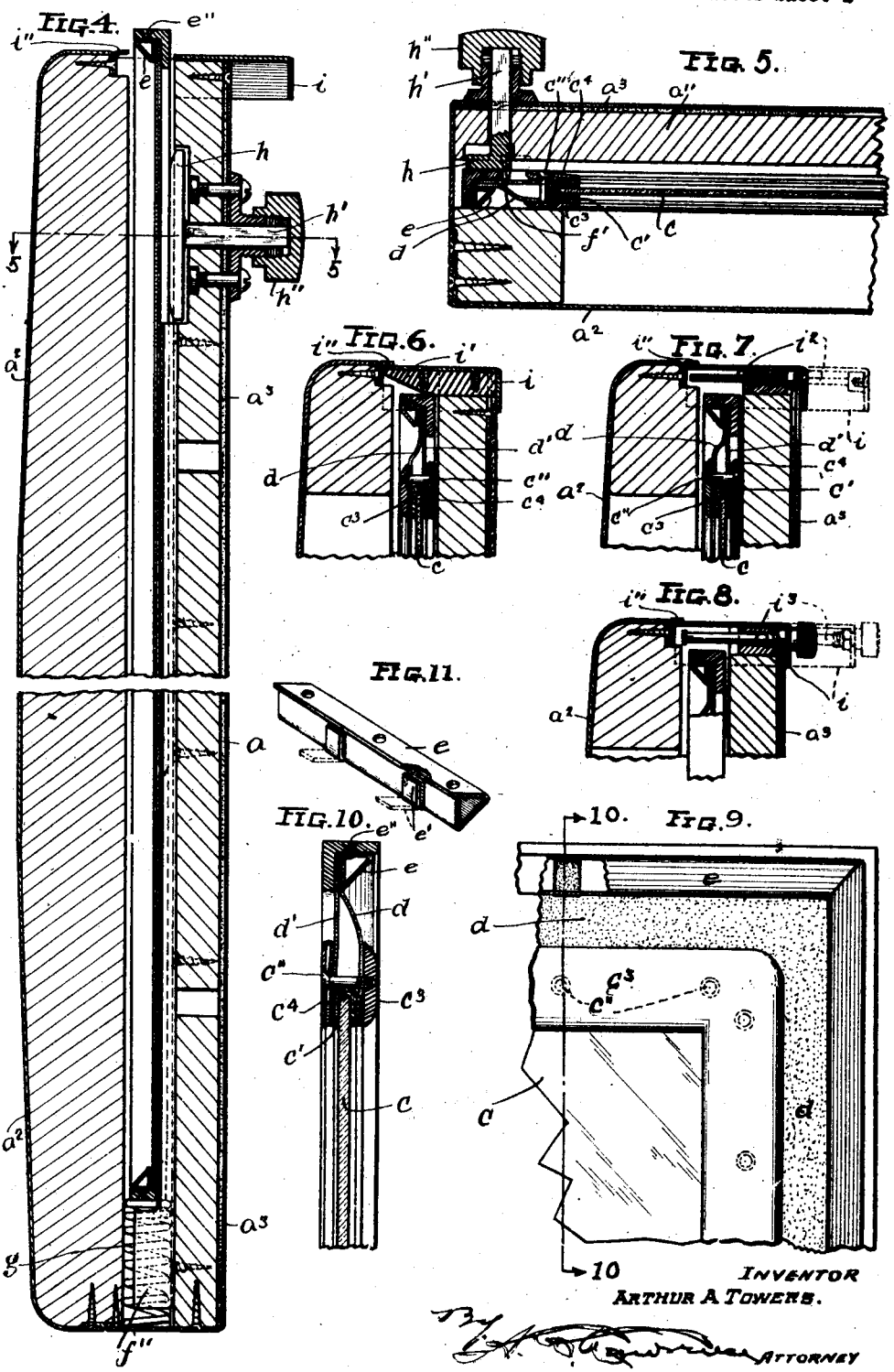
INVENTOR
ARTHUR A. TOWERS.
ATTORNEY Patented July 19, 1927.

1,636,394

UNITED STATES PATENT OFFICE.

ARTHUR A. TOWERS, OF CLEVELAND, OHIO.

DISAPPEARING WINDOW FOR VEHICLES.

Application filed June 23, 1925. Serial No. 39,007.

My invention relates to improvements in disappearing windows for vehicles and the like, and has for its objects the provision of a cheap, flexible mounting for the window glass; resilient means for cushioning the window frame and for presenting it to be raised from its disappearing position; means for securely locking it in its disappearing position and otherwise improving upon the structure in further details which will be pointed out and claimed.

At the present time vehicle windows are constructed of heavy or plate glass, mounted in rigid frames, and sliding in felt lined channels. It is a common experience that such vehicle windows are subject to more or less wear which induces annoying looseness and rattling of the windows. Obviously, the glass may not be subjected to violent impact or to great pressure without incurring the danger of breakage, and it is practically impossible to prevent the rattling of a vehicle window of this type after it has become worn.

Accordingly, I have devised a mounting for the window glass whereby it is flexibly supported from all sides, thereby permitting the use of a lighter and cheaper grade of glass with the attendant advantages of less weight and practical elimination of the danger of breaking the glass under normal conditions. Cooperating therewith, I have provided supporting springs which are placed under tension when the window is in its completely disappearing position so that it will be automatically elevated when the tension is released. Said springs also act as buffers when the window is dropped as by releasing the lateral clamps which normally hold the window in any desired elevated position. These lateral clamps are of elongated type and are associated with screw-acting means which insure the gripping of the adjacent window frame and the retention of said frame in any of its adjusted positions.

Within the disappearing slide, which is adapted to accommodate the window frame of my invention, I preferably provide guide members which bear laterally against the window frame and maintain its alinement with the slide to avoid binding and rattling, and render the operation of the disappearing window easy and certain. Locking and cover means likewise are preferably provided for the window frame when in its disappearing position.

The structural features of my improvement and further advantages and details may best be explained in connection with the accompanying drawings, wherein:

Figure 1 is a top view of the disappearing window of my invention, partially broken away and in section.

Fig. 2 is a view thereof in elevation, also partially broken away in various areas, and partially sectioned.

Fig. 3 is an irregular transverse section on the line 3—3, Fig. 2.

Fig. 4 is an enlarged vertical section on line 4—4, Fig. 1.

Fig. 5 is an enlarged fragmentary section on line 5—5, Fig. 4.

Figs. 6, 7 and 8, respectively, are enlarged fragmentary sections on lines 6—6, 7—7, and 8—8, Fig. 1.

Fig. 9 is an enlarged fragmentary corner view of the window frame and flexible mounting.

Fig. 10 is a vertical section on line 10—10, Fig. 9, and

Fig. 11 is a detail in perspective of the metal stamping employed for clamping the flexible mounting or fabric interiorly of the main frame.

Throughout the several figures of the drawings, I have employed the same character of reference to indicate similar parts.

A composite recessed slide or panel $a$ of slightly greater dimensions than the disappearing window frame is generally shown in Fig. 2, comprising in the instant embodiment, spaced transverse wooden members $a'$, $a''$, an exterior metal sheath $a^2$, an interior fabric or fabricoid facing $a^3$, and rectangular metal clamping members $a^4$.

The composite window construction of my invention comprises an exterior metallic frame $b$ which advantageously may be of L-shaped cross section and is of rectangular dimensions fitting readily within the slide of panel $a$. A translucent or glass pane $c$ of materially smaller rectangular dimensions is provided with a peripheral felt mounting $c'$ and a secondary or inclosing auxiliary frame $c^3$, $c^4$ clamping the felt and edges of the pane by means of screws $c''$ as shown in Fig. 10. There also is clamped between said secondary frame members, an intermediate diaphragm $d$ or $d'$ extending peripherally from all sides of the pane to the main frame *b*. The diaphragm or diaphragms are attached to the lugs *e'* of the bent sheet metal stamping *e* which is secured interiorly of the L-section frame by means of screws *e''* and serves to maintain the diaphragm taut for mounting the pane therein and preserving it against jar or breakage.

Accordingly, I am enabled to use a lighter and cheaper grade of glass than the plate glass which ordinarily is employed for the disappearing windows of automobiles and other vehicles, since the flexible mounting interposes a buffer upon all sides of the glass for absorbing any normal shock or blow.

Within the panel or slide at either side thereof, I provide longitudinal metal strips *f* having ribs *f'* adapted to bear against the side members of the frame *b*, as best shown at the left in Figs. 1, 3 and 5. The bottom portion *f''* of each strip is outwardly bent to form a cage for the compression springs *g* which serve the double purpose of acting as buffers when the window is dropped within the slide, and also insure the partial protrusion thereof, so that the window may be raised to any desired position.

In order to secure the disappearing window in any desired adjusted position, I preferably provide at either side of the panel an elongated member or shoe *h*, as best shown in Figs. 4 and 5, which has a rectangular stem *h'* adapted to be acted upon by the thumb screw *h''* for forcing the shoe against the side frame *b*. These means hold the frame from either side in any desired position and prevent rattling of the window.

When the window is completely closed, it is forced down against the compression spring means so that it is substantially flush with the top of the slide; the wedging members *i'* provided upon the laterally movable closure *i* being adapted to bear against the top of frame *b*, and hold the window against the tension of the springs when the closure is forced beneath the protruding lip *i''*. This closure member has horizontal movement as indicated in Figs. 7 and 8 and is provided with pins $i^2$ and intermediate locking means $i^3$ for temporarily holding the closure in the position shown in Figs. 1 and 8, whereby the slide is covered and the window is retained in its disappearing position within the panel.

Having now described the preferred embodiment of my invention and explained the principal advantages and utilities thereof, I claim as new and desire to secure by Letters Patent, together with such modifications as may be made by those ordinarily skilled in the art, the following:

1. In a disappearing window, the combination with a window frame, of a slide substantially the height of the frame and adapted to accommodate the same, compression spring means associated with the slide adapted to be engaged by and effect the partial protrusion of the frame, and locking means for maintaining the frame within the slide against the tension of the compression spring, substantially as set forth.

2. In a disappearing window, the combination with a window frame, of a slide substantially the height of the frame and adapted to accommodate the same, compression spring means associated with the slide adapted to be engaged by and effect the partial protrusion of the frame, a wedging member associated with the upper portion of the frame, and locking means adapted to react thereon for temporarily retaining the frame within the slide against the tension of the compression spring, substantially as set forth.

3. In a disappearing window, the combination with a window frame, of a slide substantially the height of the frame and adapted to accommodate the same, a clamping member extending parallel with one side of the frame and positioned within the slide, and screw-acting means reacting intermediately of said clamping member to release or retain the frame in its adjusted position within the slide, substantially as set forth.

4. In a disappearing window, the combination with a window frame, of a slide substantially the height of the frame and adapted to accommodate the same, elongated clamping members positioned within the slide adjacent to each lateral member of the window frame, a stem extending intermediately from each of said claming members, and screw-acting means associated with said stems for engaging and releasing the clamping members with respect to the side frame members for retaining the window in its adjusted position within the slide, substantially as set forth.

5. In a disappearing window, the combination with a window frame and a slide adapted to accommodate said window, of compression springs disposed at the bottom of the slide, a cover member adapted when retracted to close the slide, and locking means for maintaining the cover member in its closed position, substantially as set forth.

6. In a disappearing window, the combination with a window frame, of a slide adapted to receive said frame and elongated ribbed members within the slide positioned in alinement with the frame and bearing against the same at either side for maintaining the alinement of the frame with respect to the slide, and means for securing the window frame in its adjusted positions within the slide, substantially as set forth.

7. In a disappearing window, the combination with a window frame, of a slide adapted to accommodate the same, elongated metallic ribbed members extending laterally of the slide and engaging the inner edges of the side frames of the window, terminal cages respectively provided in alinement with said members, compression springs located within said cages in position to be engaged and compressed by the bottom of the window frame, and locking means for the window frame, substantially as set forth.

8. In a disappearing window, the combination with a window frame, of a slide adapted to receive and inclose said window frame, compression spring means associated with said slide and retracted thereby when the window frame is fully inserted within the slide, a wedging closure member reacting against the top of the frame, adapted to cover the inserted window frame, and means for temporarily locking the closure and window frame in the disappearing position of the latter, substantially as set forth.

In testimony whereof I do now affix my signature.

ARTHUR A. TOWERS.